US005660658A

United States Patent [19]

Johnson et al.

[11] Patent Number: 5,660,658

[45] Date of Patent: Aug. 26, 1997

[54] DECALCOMANIA APPLICATION METHOD AND APPARATUS

[75] Inventors: Lance Johnson, Lindenhurst; Philip Meere, St. Charles; Chris Dixon, McHenry; Andrew Martyniuk, Bensenville, all of Ill.

[73] Assignee: P & L Mark-It, Inc., Batavia, Ill.

[21] Appl. No.: 522,015

[22] Filed: Aug. 31, 1995

[51] Int. Cl.$^6$ .................................................. B32B 31/00

[52] U.S. Cl. ............................ 156/64; 156/236; 156/239; 156/240; 156/309.3; 156/324.4

[58] Field of Search ............................ 156/324.4, 309.3, 156/236, 239, 240, 64

[56] References Cited

U.S. PATENT DOCUMENTS 2,057,625 10/1936 Carr et al. ............................ 156/324.4

2,231,262 2/1941 Fridolph .............................. 156/309.3

*Primary Examiner*—John J. Gallagher

*Attorney, Agent, or Firm*—Knechtel, Demeur & Samlan

[57] ABSTRACT

A method and apparatus for preconditioning a decalcomania transfer for application to a receiving substrate in which the decalcomania is passed through a solution to precondition it for transfer. The decalcomania is fed through a pair of opposed web-like members, passed through a solution bath and has excess solution removed from the decalcomania prior to application to the receiving surface. By controlling the speed of the web-like members, the submersion time of the decalcomania in the solution is controlled. The apparatus is a container which houses the web-like feeder belts and the solution bath. The bath is partially enclosed to minimize evaporation of the solution. A pair of rollers at the outlet of the apparatus control the amount of solution remaining in the decalcomania such that the decalcomania exiting the apparatus will have sufficient solution to allow easy transfer to the receiving surface yet not have too much solution as to result in excess dripping of solution on the receiving item.

11 Claims, 2 Drawing Sheets

DECALCOMANIA APPLICATION METHOD AND APPARATUS

FIELD OF THE INVENTION

The present invention relates to a decalcomania of the type used for decorative purposes or identification purposes. They may be used on various items made of plastic, glass or fiberglass for decorative purposes. They may decorate automobiles, bicycles and vehicles and have a whole host of uses. Decalcomanias have been known in the art for over 100 years. Basically, the decalcomania is a printed image on a carrier which is transferred to a substrate to which it is to be applied. The present invention deals with a method and apparatus which is useful in activating a decalcomania transfer from a backing sheet to the transferred item.

BACKGROUND OF THE INVENTION

The invention is directed to the application of a decalcomania to a substrate in which the decalcomania is soaked in a preparatory solution which renders it amenable to transfer to a receiving surface.

The solutions which are employed often times can contain undesirable components. The undesirability can relate to discoloration, inability to permit the decal to be applied without bubbles, or liquids which may give off noxious fumes, and the like. It therefore becomes a problem with any such solutions to render them "user friendly" with the person who is applying the decalcomania to the given product. Hypothetically, the solutions may incorporate materials which may irritate people's hands. This is more common if people work without gloves for extended periods of time in which case their fingers may become irritated much as the same as using strong dishwater soap for long periods of time.

In addition, when the solution is applied manually, normally by just dipping into a tray, there is no control over the actual amount of solution which is applied to the decalcomania. Normally, however, the decal is soaked to a point where when it is to be applied to a vertical surface, it can drip and this means the dripping of the residual solution on the receiving surface could leave an undesirable streak.

In addition, as in most processes, there are optimum conditions for best application. What is therefore needed is the method of soaking the decalcomania in a sufficient amount of solution to render it amenable to a permanent transfer, and then controllably eliminating such solution from the decalcomania to a point where it will not drip, and yet has a sufficient residual amount of solution to allow easy transfer to the receiving surface. The amount of residual solution must be controlled so that the decalcomania is transferred to a vertical, horizontal or other curvilinear surface without exuding excess solution from the lateral edges. This minimizes streaking while at the same time enhancing the ability of eliminating subsurface, unsightly bubbles.

SUMMARY OF THE INVENTION

The present invention stems from the discovery of a method and apparatus whereby a decalcomania is fed into a pair of opposed path defining belts, operated on rollers, to carry the decalcomania below the surface of solution in a container, thereafter elevate the same from the solution in the container, and pass the same through a metering station where desirably rollers squeeze out the excess solution from the decalcomania as the same is being delivered to the exit rollers. From this point, the decal is directed to a feeding surface and then can be removed and applied to the ultimate receiving surface or area of application. The method comprises the steps of confining between two belts or webbed members the decal, transferring the same into a conditioning solution, and thereafter meteringly removing sufficient solution from the decalcomania to the point that the amount of solution is controlled so that excess solution is removed but there still remains sufficient active solution in the decalcomania for its transfer to the receiving surface.

In view of the foregoing, it is a principal object of the present invention to apply a solution to a decalcomania in a pre-controlled fashion where hand dipping is not required and where a predetermined optimized amount of solution remains on the decalcomania prior to transfer to a receiving surface.

A further object of the present invention is to achieve the soaking in the transfer solution where the solution is contained in a confined environment to thereby inhibit cross-contamination with other fluids in the area to inhibit the exuding of noxious fumes, and to actually prevent the human operators from placing their hands or exposing any portion of their body to the area where the decalcomania is being subjected to the solution application. Another object is the object of automatically refilling the solution container to maintain it at an operable level whereby the process does not have to be interrupted to refill the solution container.

A further and not necessarily final object of the present invention is to develop such an apparatus and method which is cost effective, easily transported from one job site to another and susceptible of usage with a wide variety of decalcomanias as well as transfer solutions.

DESCRIPTION OF ILLUSTRATIVE DRAWINGS

Further objects and advantages of the present invention will become apparent as the following description of an illustrative embodiment proceeds, taken in conjunction with the accompanying drawings in which.

DESCRIPTION OF THE APPARATUS

Figure 1:
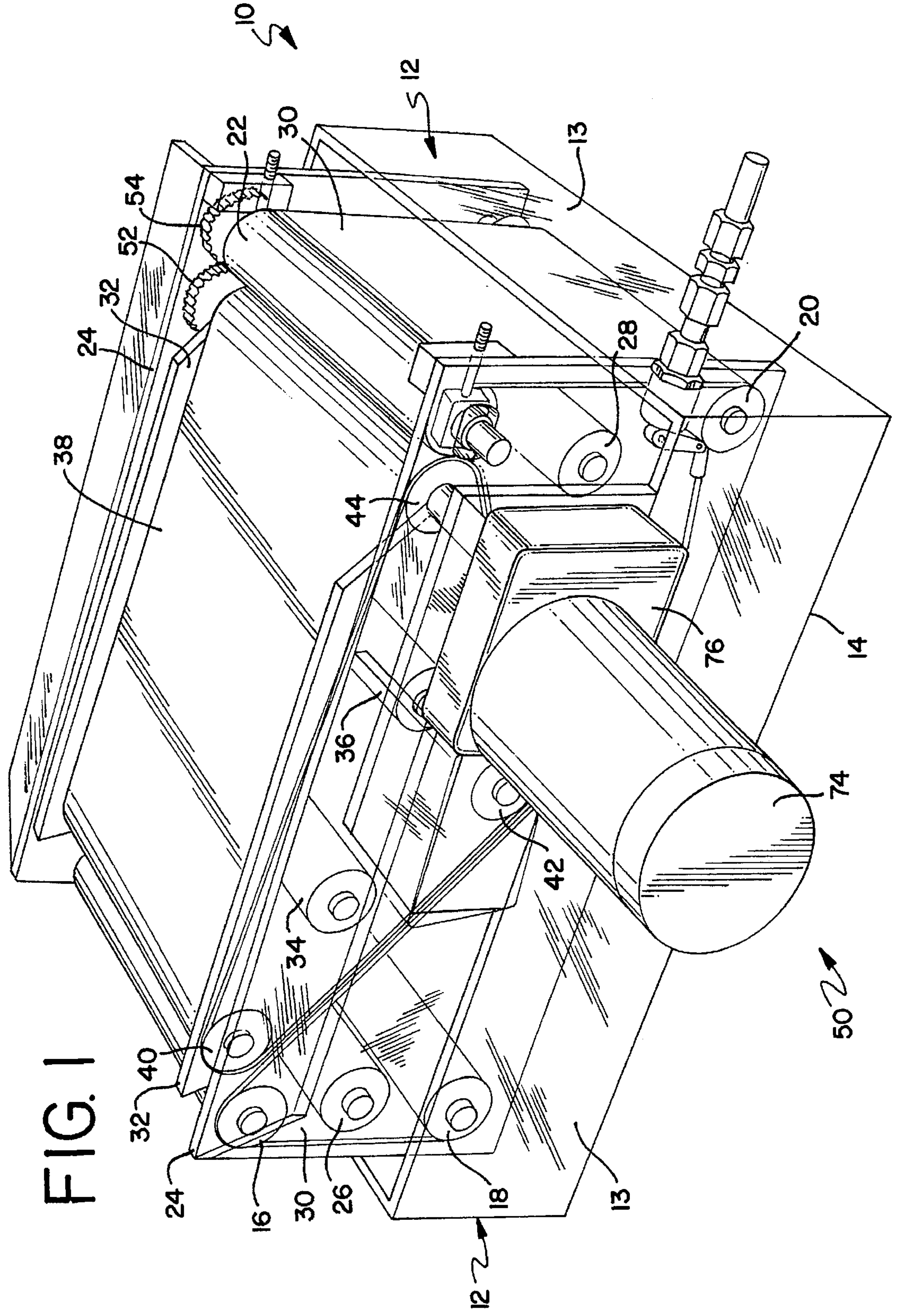
FIG. 1 is a perspective view of the subject apparatus illustrating the drive mechanism, solution bath and belt arrangement.

Turning first to FIG. 1, there is illustrated the apparatus 10 for practicing the subject invention. There will be seen that the apparatus 10 includes an outer container 12 which container has four sidewalls 13 and an internal bottom tray 14. The solution or fluid 15 is placed between the high and low optimum levels. A series of rollers 16, 18, 20 and 22 are rotatably mounted on a first plastic frame assembly 24 which is placed within the container 12. Supports 26 and 28 are rigidly mounted to and give structural strength to the frame 24. An endless belt 30 is placed around the set of rollers 16, 18, 20 and 22.

A second plastic frame 32 is located within the first plastic frame 24. Tubular supports 34 and 36 are rigidly mounted to and give structural strength to the second frame 32. A second endless belt 38 is placed around a second grouping of rollers 40, 42 and 44 rotatably mounted within frame 32. Rollers 16 and 40 with their respective belts 30 and 38 form an inlet nip 46 through which a decalcomania 48 is inserted. Although the belts 30 and 38 are described as endless belts, other similarly constructed endless webbed members are also adaptable to operation in Applicant's invention and are considered equivalent structures.

Figure 3:
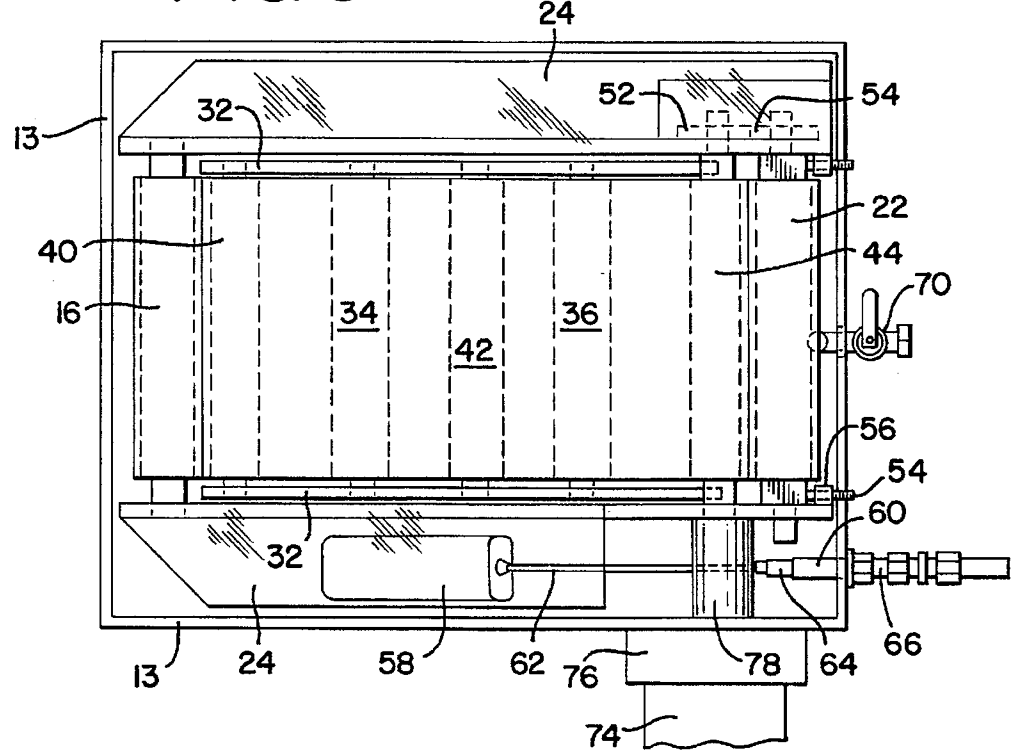
FIG. 3 is a top plan view with portions removed of the apparatus of FIG. 1.

A drive mechanism 50, illustrated in FIGS. 1 and 3 and which will be described in greater detail below, provides power to roller 44. Power is supplied to roller 22 through gears 52 and 54 which are mounted at one end of rollers 44 and 22. This in turn drives belts 30 and 38. Furthermore, rollers 22 and 44 are in contact with each other through the belts 30 and 38 frictionally contacting each other such that as power is applied to the belt 38, belt 30 will move in unison in a driving direction. As such, a path is formed between the belts 30 and 38 below the surface of the solution 15. The decalcomania 48 once inserted into the inlet nip 46 will pass through the solution 15 and exit at an exit nip 52 which is defined between rollers 22 and 44.

There are means provided for adjusting the compressive force between rollers 22 and 44. This adjustment can be by means of a spring loaded screw 54 which pushes on block 56 in which is mounted the shaft of roller 22. The shaft itself can slide in a groove (not illustrated) in the frame assembly 24. This moves roller 22 towards or away from roller 44. Thus, the compressive force between the two rollers and in turn on the decalcomania passing therebetween can be adjusted. By increasing the force between these rollers, the amount of compression and hence the amount of solution remaining on the decalcomania 48 can be controlled. As such, a metering station is formed at nip 52.

There is also provided a separate solution level monitoring means in the container 12. This is comprised of a float 58 connected to a float valve 60 by means of a rod 62 and link 64. The inlet to the float valve 60 is connected to an inlet tube 66 which is in turn connected to a solution replenishing source or reservoir (not illustrated). When the solution 15 is below a pre-set level, the float valve 60 will open and allow solution from the reservoir to enter into the container 12 until a predetermined fluid height is reached at which time the float 58 causes valve 60 to close. As the solution is used up during the decalcomania preconditioning, and the level decreases, the float 58 drops which opens valve 60 again permitting solution 15 from the reservoir to enter. In this manner, the solution is maintained between optimum pre-set high and low levels. A drain pipe 68 and drain valve 70 permit emptying the container 12 when desired.

Figure 2:
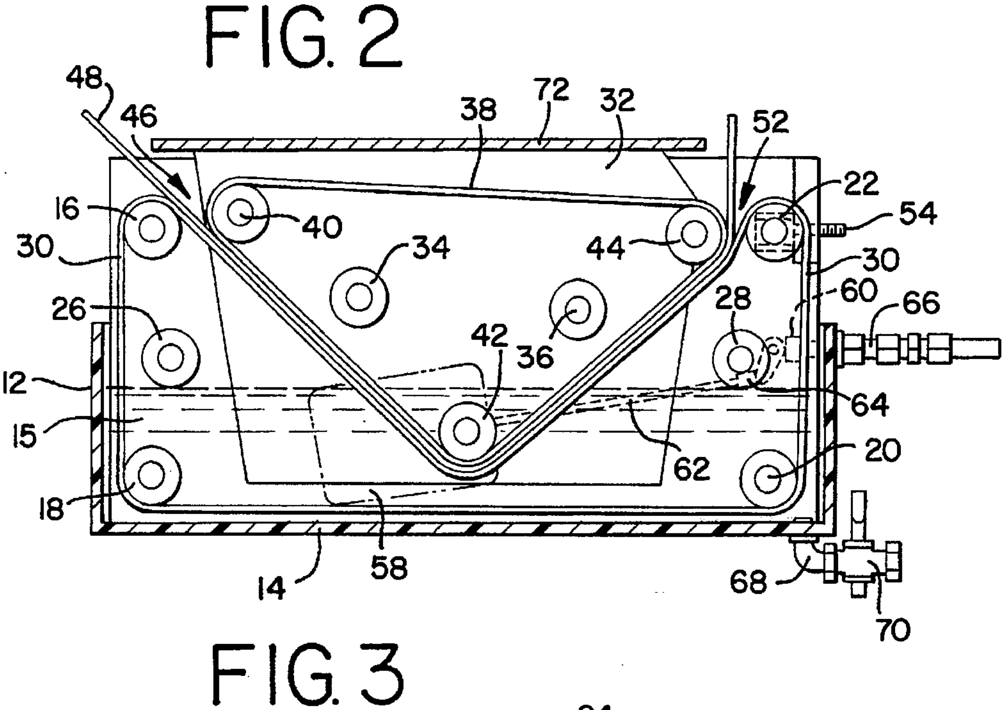
FIG. 2 is a longitudinal cross-sectional view of the apparatus shown in FIG. 1 illustrating the principal elements of the rollers, opposed belts, fluid level and the metering and delivery portion.

The solution 15 is subject to substantial evaporation during operation of the apparatus. This causes the concentration of the solution to vary which changes the application results, characteristics and parameters of the apparatus 10. Thus, it is desirable to minimize the evaporation of solution 15. This is achieved by partially enclosing the outer container 12 by means of adding a top 72 which rests upon the top of the second plastic frame 32. (See FIG. 2.) By varying the length of the top 72 and the height of the four side walls 13, the container 12 can be even further enclosed such that only the entrance and exit nips 46 and 52 are open.

The drive mechanism 50 for the unit is preferably a 12 volt D.C. electric motor 74 which can be operated from a 120 V A.C input low voltage battery charger. In this way, the wiring to the motor is at low voltage and minimizes the risk of electric shock should the electrical wires contact any other fluids in the area, become wet or are inadvertently touched by a person. A variable speed controller can be added if infinite motor speed control is required. The motor is mounted to a gearbox 76 to lower shaft speed and increase torque. Alternatively, the electric motor could be connected to a multiple speed gear mechanism which has several available gear ratios to provide for several alternative speed configurations. The output from the gearbox 76 is connected to roller 44 by means of standard shaft couplings 78. Thus, if greater dwell time is required by the decalcomania as it passes through the bath, a lower speed could be used. If less time is required, a higher speed, and, therefore, a higher throughput, can be selected. Another alternative means of providing for a greater dwell time using a single speed motor is to increase the size of the unit such that the path of travel of the decalcomania through the bath is increased. However, by using one standard size apparatus, with a variable speed drive system, various dwell times can more easily be achieved.

To provide access to any material that may become trapped between the belts 30 and 38 the second plastic frame 32 and all of its rollers and supports can pivot around roller 44. This can best be seen in FIG. 3 wherein the shaft of roller 44 passes through the second plastic frame 32 and into the frame assembly 24. The shaft of roller 44 thus creates the pivot point around which second frame 32 rotates.

Once the decalcomania exits the exit nip 52, it can be received on a shelf or on an automatic transfer mechanism such as a conveyer belt to transport it to persons or machinery that apply the decalcomania to the ultimate receiving surface.

Method

While the method is practiced by the apparatus 10 as essentially described above, it will be appreciated that the heart of the method relates to confining the decalcomania 48 to be transferred between opposed belts. Once confined, the decalcomania 48 is never released from the belts until it has been saturated with the solution 15 to a point when the decalcomania 48 can easily be removed from its substrate or carrier. The decalcomania is then squeezed between the pair of exit rollers 22 and 44 so that the excess solution 15 is removed. However, too much solution should not be removed as the transfer of the decalcomania to the receiving surface will not be satisfactory.

Figure 4:
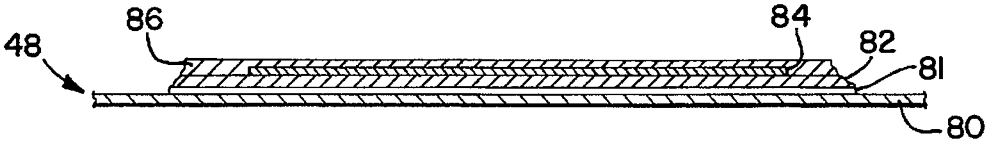
FIG. 4 is a diagrammatic enlarged cross-section of a typical decalcomania transfer showing the substrate, the ink portion and the transparent outer coatings.

The solutions which are desirably employed in the subject transfer include many solutions, having an alcohol base. However, the invention is designed for use with all solutions regardless of the base. The solution is formulated to enhance the adhesion of the decalcomania to the receiving surface. The decalcomania 48 normally includes a substrate or carrier sheet of paper, a release agent, ink and a clear coating which is on the top and bottom of the ink. As seen in FIG. 4, there is a substrate or base paper 80, a clear coat 82, a release agent 81 between the paper 80 and clear coat 82, a second or several layers of inks 84 which form the design and then a final clear coat 86. The solution 15 activates the release agent 81 which releases the paper substrate 80 from the first clear coat layer 82. The solution also activates the final clear coat 86 such that the decalcomania 48 adheres to the receiving surface supplying ample adhesion to the receiving surface for its end use.

By controlling the force between the exit rollers 22 and 44, the operator will determine the amount of solution 15 remaining in the decalcomania 48 to be transferred. The operator can increase the pressure such that there is not too much solution remaining such that running or dripping results when the decalcomania is applied to the receiving surface. However, if the decalcomania does not readily transfer onto the receiving surface, the operator must decrease the compressive force of the exit rollers such that more solution remains in the decalcomania. This will permit easy transferability while not having an excessive amount of solution run off. The actual application of the decalcomania to the receiving medium is done in the conventional manner of placing the decalcomania 48 with the paper or substrate 80 side up and activated clear coat 86 against the receiving surface, squeegeeing the back of the paper with a squeegee or roller and peeling off the paper substrate 80. The decalcomania can be further squeegeed or blotted with the excess solution wiped away. A visual inspection will determine whether additional squeegeeing is necessary in order to remove any undesirable remaining bubbles. Once the clear coat layers 82 and 86 dry, the decalcomania will firmly adhere to the receiving surface.

In summary, the invention deals with the automatic application of a solution to a decalcomania transfer in a confined and controlled fashion where the operator does not need to handle the decalcomania transfer other than to place the same in a feed position and remove the same after it exits the solution bath device. All that need be done with the decalcomania at this point is to apply it to the receiving medium. Additional attachments are contemplated by the invention, including a pre-rinse, a stack or end feeder and a collator which receives the decalcomania after they have been subjected to the preconditioning solution and the stripping of excess solution prior to application on the intended receiving item.

Thus, there has been provided a method and apparatus for decalcomania transfer that fully satisfies the objects, aims and advantages set forth herein. While the invention has been described in conjunction with a specific embodiment, it is evident that many alternatives, modifications and variations will be apparent to those skilled in the art in light of the foregoing description. Accordingly, it is intended to embrace all such alternatives, modifications and variations as fall within the spirit and scope of the appended claims.

What is claimed is:

1. A method for preconditioning a decalcomania transfer for application to a receiving surface in which the decalcomania is passed through a solution to precondition it for transfer comprising the steps of:

confining the decalcomania transfer between a pair of opposed belts, passing said decalcomania through a bath of said solution and submerging the same in the solution intended to precondition it for transfer, passing the thus confined decalcomania through an exuding station, removing excess solution from the decalcomania through mechanical pressure means, metering the removal of the solution to an optimum point where the transfer when held in any condition will contain an operable amount of transfer solution and thereafter applying the decalcomania to a receiving surface.

2. The method of claim 1 further comprising the step of at least partially enclosing said bath in an enclosure to reduce solution evaporation.

3. The method of claim 1 further comprising the added step of monitoring the level of solution in the bath and automatically refilling the bath when the solution level has dropped below a predetermined minimum level.

4. The method of claim 1 further comprising the added step of applying a driving force to said belts to cause the belts to move in the same direction.

5. The method of claim 4 further comprising the added step of controlling the driving force thereby controlling the speed of the belts and the submersion time of the decalcomania through the bath.

6. The method of claim 1 further comprising the step of transporting the decalcomania from the exuding station to an application area where the decalcomania is applied to the receiving surface.

7. A method for preconditioning a decalcomania transfer for application to a receiving surface comprising the steps of:

feeding the decalcomania transfer between a pair of opposed feeder belts, transporting said decalcomania along a path passing from an inlet area, down through a submersion tank, and exiting at an outlet area above the submersion tank, submerging said decalcomania in a solution in said submersion tank, the solution preconditioning the decalcomania for transfer, applying a compressive force to the opposed feeder belts at the outlet area to remove excess solution from the decalcomania, controlling the removal of the solution at the outlet area to an amount that the decalcomania has a sufficient amount of transfer solution remaining to allow expeditious transfer to the receiving surface yet not too much solution as to create excessive dripping and running off of the excess solution after transfer, applying the decalcomania to a receiving surface, and removing the excess solution.

8. The method of claim 7 further comprising the step of at least partially enclosing the submersion tank in an enclosure to reduce solution evaporation.

9. The method of claim 7 further comprising the step of monitoring the level of solution in the submersion tank and automatically refilling the tank when the solution level has dropped below a predetermined minimum level.

10. The method of claim 7 further comprising the step of applying a driving force to said opposed feeder belts to cause the belts to move in the same feeding direction.

11. The method of claim 10 further comprising the step of controlling the driving force thereby controlling the speed of the belts and the submersion time of the decalcomania through the submersion tank.

* * * * *